United States Patent
Favre

(10) Patent No.: US 8,875,617 B2
(45) Date of Patent: Nov. 4, 2014

(54) APPARATUS AND CAPSULE FOR PREPARING A DRINK

(75) Inventor: Eric Favre, St-Barthelemy (CH)

(73) Assignee: Mocoffee AG, Zürich (CH)

( * ) Notice: Subject to any disclaimer, the term of this patent is extended or adjusted under 35 U.S.C. 154(b) by 729 days.

(21) Appl. No.: 12/736,139

(22) PCT Filed: Mar. 13, 2009

(86) PCT No.: PCT/IB2009/051047
§ 371 (c)(1),
(2), (4) Date: Sep. 14, 2010

(87) PCT Pub. No.: WO2009/113035
PCT Pub. Date: Sep. 17, 2009

(65) Prior Publication Data
US 2011/0000377 A1   Jan. 6, 2011

(30) Foreign Application Priority Data

Mar. 14, 2008 (EP) .................................. 08004876

(51) Int. Cl.
*A47J 31/40* (2006.01)
(52) U.S. Cl.
USPC .......................................... 99/289 R; 99/295
(58) Field of Classification Search
CPC .............. A47J 31/3623; A47J 31/3628; A47J 31/3633; A47J 31/3638; A47J 31/3642
USPC ........................................ 99/289 R, 295, 279
See application file for complete search history.

(56) References Cited

U.S. PATENT DOCUMENTS

| | | | | |
|---|---|---|---|---|
| 3,584,767 A | * | 6/1971 | Dawson et al. | 222/85 |
| 5,755,149 A | * | 5/1998 | Blanc et al. | 99/289 T |
| 5,776,527 A | * | 7/1998 | Blanc | 426/77 |
| 6,955,116 B2 | * | 10/2005 | Hale | 99/295 |
| 7,219,596 B2 | * | 5/2007 | Kief, Jr. | 99/289 R |
| 2003/0071056 A1 | | 4/2003 | Hale | |

FOREIGN PATENT DOCUMENTS

| | | |
|---|---|---|
| EP | 1 444 932 A | 8/2004 |
| EP | 1 541 070 A | 4/2005 |
| EP | 1 767 129 A | 3/2007 |
| WO | WO 2007/031378 A | 3/2007 |
| WO | WO 2007/045553 A | 4/2007 |
| WO | WO 2008/004116 A1 | 1/2008 |

OTHER PUBLICATIONS

Machine translation of EP 1444932 A1, accessed from espacenet.com.*

(Continued)

*Primary Examiner* — John Wasaff
(74) *Attorney, Agent, or Firm* — Faegre Baker Daniels LLP

(57) ABSTRACT

Apparatus for making a drink or liquid food from a capsule (3) containing a substance to be mixed with water injected at pressure into the capsule, the apparatus comprising a mixing unit (4) with a capsule insertion channel (14), a capsule holder (8) with a mixing wall (22), an injecting head (10) for injecting water into the capsule, and an opening and closing mechanism (12) for producing a relative movement between the capsule holder and the injecting head to open and close the injecting head on the capsule holder. The insertion channel is inclined at an angle of between 30 and 60 degrees relative to a horizontal plane (HZ).

17 Claims, 21 Drawing Sheets

(56) References Cited

OTHER PUBLICATIONS

English translation of the International Preliminary Report on Patentability, Bureau International de l'OMPI, Geneva, Switzerland, dated Oct. 5, 2010, for International Application No. PCT/IB2009/051047.

International Search Report and Written Opinion for PCT/IB2009/051047 issued by the European Patent Office on Sep. 18, 2009.

* cited by examiner

APPARATUS AND CAPSULE FOR PREPARING A DRINK

The present invention relates to an apparatus and a capsule for preparing a drink by injection of pressurized hot water into the capsule.

Apparatus for preparing drinks by injection of hot water through a capsule containing a substance to be extracted, such as coffee, are known and for example described in publications EP1646304, EP1646305, WO2007016977. In EP1646305, the capsule is introduced into the apparatus by orienting the capsule so that the injection and extraction faces are found in a substantially vertical plane. The capsule is retained in an intermediate position and then moved from the intermediate position to its final position in the capsule-holder when the closing mechanism for the injection is actuated.

In the device according to the publication WO007016977, the capsule is directly introduced into a capsule-holder in a first position, the capsule-holder then being pivoted into a second injection position and after the injection again pivoted into a third position for ejecting the capsule. A disadvantage of this prior system results from the multiple movements of the capsule-holder, from the complexity of the mechanism parts which may reduce the reliability of the apparatus and increase its cost. Moreover, it is more difficult to ensure a perfect seal of the injection head against the capsule-holder, around the capsule taking high pressures (6-12 bars) into account.

The object of the invention is to provide an apparatus for preparing drinks from capsules by injecting pressurized hot water, which is reliable and economical.

It is advantageous to provide an apparatus for preparing drinks from capsules, which is easy to use.

It is advantageous to provide an apparatus for preparing drinks from capsules, which is ergonomical.

It is advantageous to provide an apparatus for preparing drinks from capsules allowing the extraction of high pressure drinks in a reliable way.

Objects of the invention are achieved by the apparatus for preparing drinks from capsules by injection of pressurized hot water according to claim 1.

An apparatus and a capsule for preparing a drink or a foodstuff are described herein, the capsule containing a substance to be extracted by introducing hot water into the capsule, the apparatus comprising an extraction block with a channel for introducing the capsule, a capsule-holder with an extraction wall, an injection head for injecting hot water into the capsule, and an opening and closing mechanism for effecting a relative movement between the capsule-holder and the injection head for opening and closing the injection head at the capsule-holder. The introduction channel is tilted by an angle comprised between 30 and 70 degrees relatively to the horizontal plane. A portion of the sidewall of the housing of the capsule-holder away from the introduction channel is tilted by an angle comprised between 55 and 25° relatively to the horizontal plane.

The sidewall of the casing of the capsule has a truncated flared shape, the conicity angle in one embodiment being between 0° and 10°. In an embodiment, the capsule filled with a substance for preparing a drink, has a weight distribution such that the centre of gravity G is located in the lower portion of the capsule, i.e. between the line at half-height and the bottom. This allows improvement of the orientation of the capsule when it falls in the housing in order to ensure that it reliably falls. The centre of gravity may be lowered by varying the thickness and the shape of the casing of the capsule, for example by having addition of material on the bottom wall of the capsule. The bottom of the capsule may be thicker than the sidewalls of the capsule.

In an embodiment, the centre of gravity is lowered by only partly filling the casing of the capsule with a substance for preparing a drink, at a level of less than 95%, preferably less than 90% of the total volume of the interior of the capsule.

Advantageously, the angle of the introduction channel allows the capsule to be introduced as far as its final position in the capsule holder and also allows easy ejection of the capsule in a compact and economical configuration. The introduction channel is preferably tilted at an angle comprised between 40 and 60 degrees relatively to the horizontal plane. The angle of the introduction channel combined with the tilt of the sidewall portion of the housing of the capsule and the shape of the capsule gives the possibility of ensuring that the capsule is stopped without any additional mechanism.

The extraction block comprises an orifice for ejecting the capsule which may advantageously be oriented at a side angle $\beta$ between 20 and 60 degrees, relatively to a vertical plane (PV) passing through an axis (IN) of the introduction channel. Preferably, the side angle $\beta$ is comprised between 30 and 50 degrees.

Objects of the invention are also achieved by the apparatus for preparing drinks from capsules by injection of pressurized hot water, according to claim 5.

An apparatus for preparing a drink or a liquid foodstuff from a capsule containing a substance to be extracted by introducing pressurized water into the capsule is described herein, the apparatus comprising an extraction block with a channel for introducing the capsule, a capsule-holder with an extraction wall, an injection head for injecting water into the capsule, and an opening and closing mechanism for effecting a relative movement between the capsule-holder and the injection head for opening and closing the injection head at the capsule-holder, the apparatus further comprising a mechanism for ejecting the capsule, comprising a pusher configured so as to engage with the underside of a flange of the capsule when the injection head is moved up again to its open position.

The mechanism for ejecting the capsule comprises a tie rod or a tie rod portion integral with the pusher or attached to the latter and comprising a hook, a shoulder or any other disconnectable coupling means configured for engaging with a shoulder, a hook or any other additional disconnectable coupling means of the injection head when it is moved up again.

The mechanism for ejecting the capsule may be provided with a return spring pushing back the pusher into a setback position allowing a capsule to be inserted into the housing of the capsule-holder.

The mechanism for ejecting the capsule may advantageously comprise a cam on or attached to the extraction block, configured for releasing the tie rod from the injection head when the injection head moves up again to its open position.

Objects of the invention are also achieved by the apparatus for preparing drinks from capsules by injecting pressurized hot water according to claims 6 and 7.

An apparatus for preparing a drink or a liquid foodstuff from a capsule containing a substance to be extracted by introducing pressurized water into the capsule is described herein, the apparatus comprising an extraction block with a channel for introducing the capsule, a capsule-holder with an extraction wall, an injection head for injecting water into the capsule, and an opening and closing mechanism for effecting a relative movement between the capsule-holder and the injection head in order to open and close the injection head at the capsule-holder, characterized in that the capsule-holder is pivotally mounted relatively to the body of the extraction block, the capsule-holder being pivotable from an extraction position to a position for discharging the capsule, the apparatus further comprising a mechanism for ejecting the capsule comprising a rail configured in order to support a flange of the capsule when the capsule-holder is pivoted from its extraction position to its discharge position.

Other objects and advantageous aspects of the invention will become apparent from the claims, from the detailed description and from the appended drawings wherein:

FIG. 1b is a perspective and sectional view of the extraction block according to FIG. 1a;

FIG. 1c is a top view of the extraction block according to FIG. 1a;

FIG. 1d is another sectional view of the extraction block according to FIG. 1a;

Figure 5A:
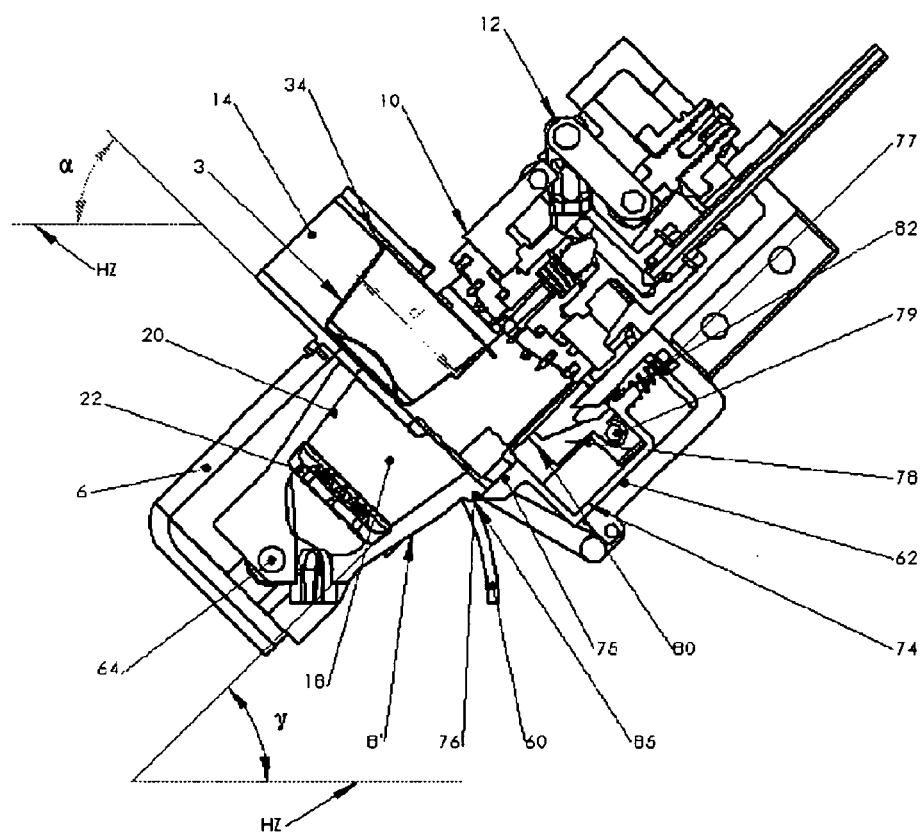
FIGS. 5a-5g are sectional views of the extraction block according to another embodiment of the invention, showing steps in a cycle for operating the machine from the introduction of a capsule up to the extraction of the capsule.
Figure 5B:
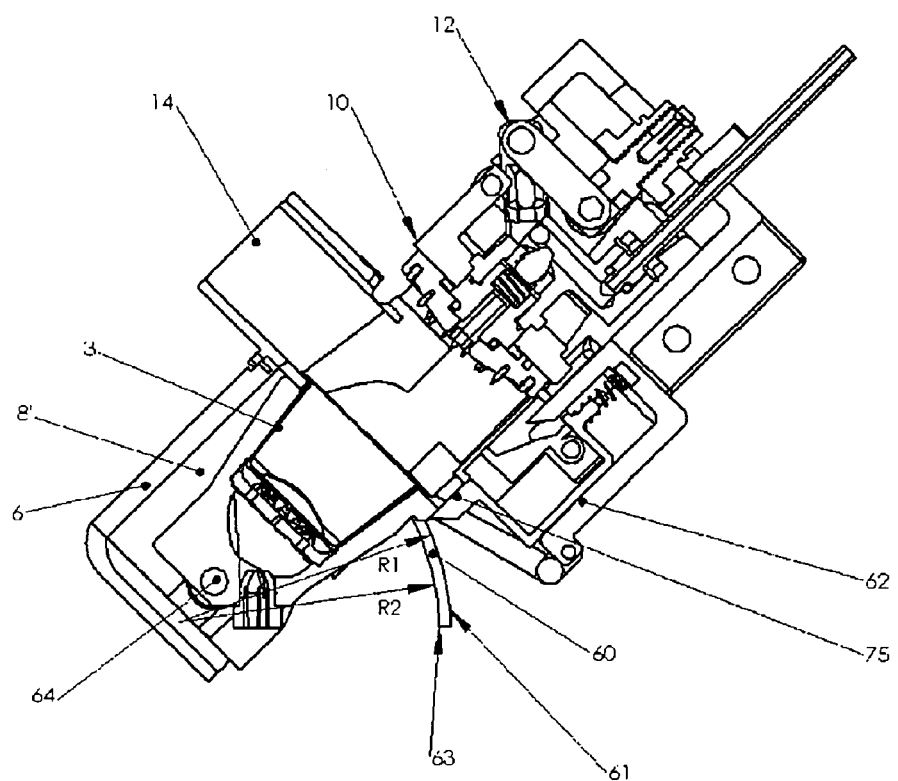
Figure 5C:
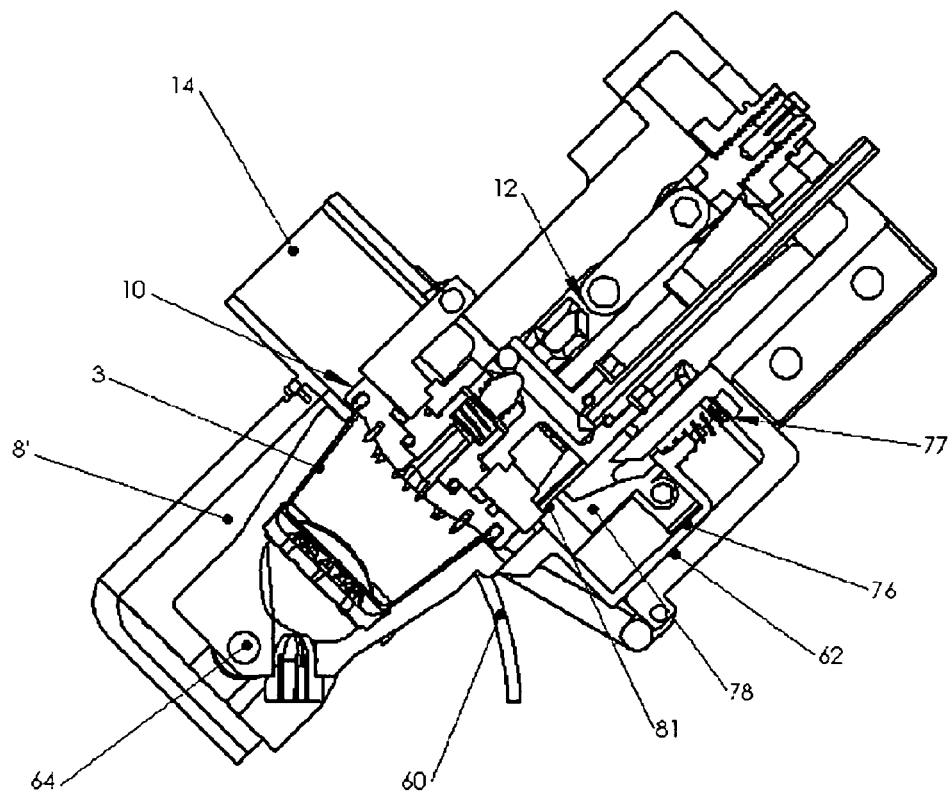
Figure 5D:
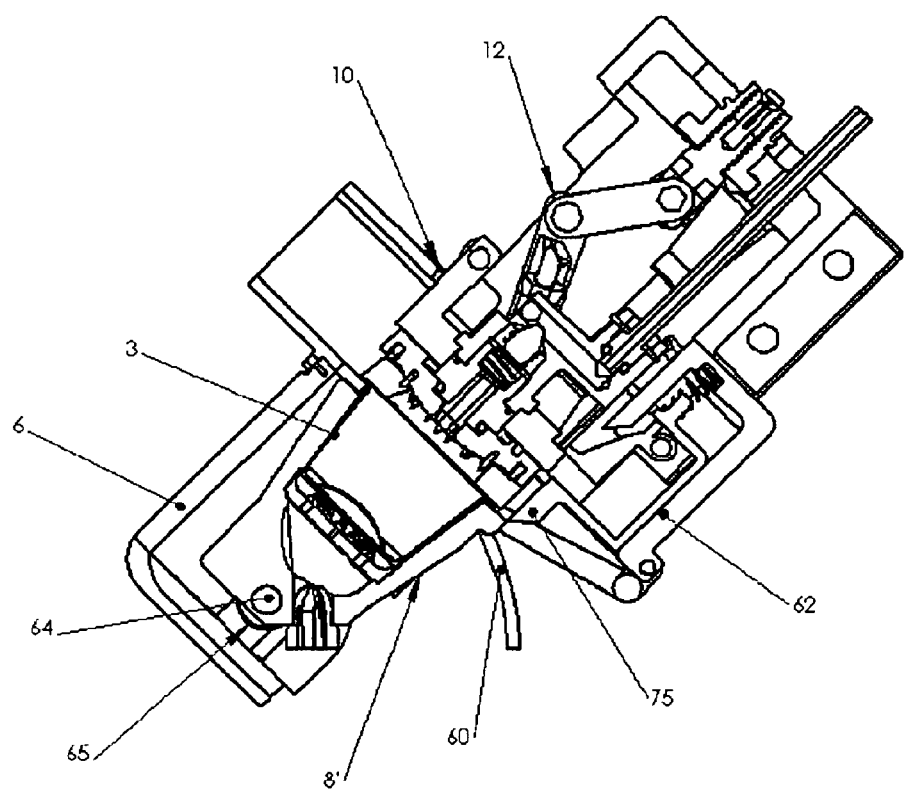
Figure 5E:
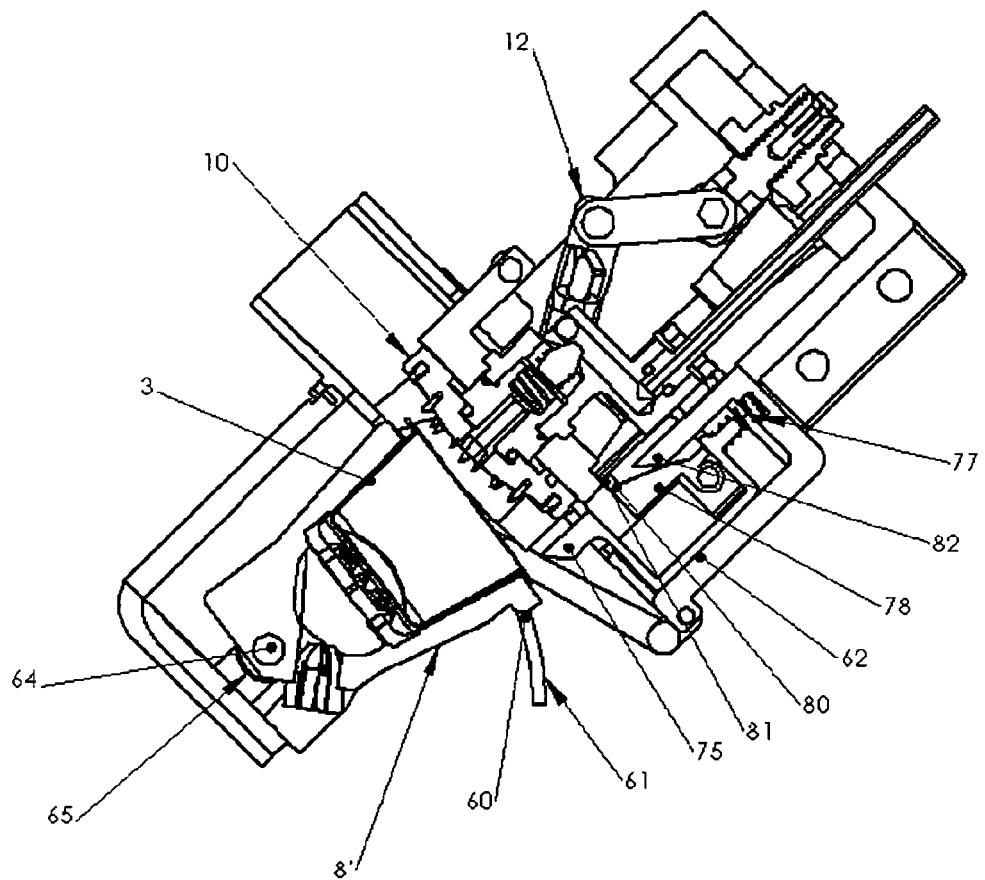
Figure 5F:
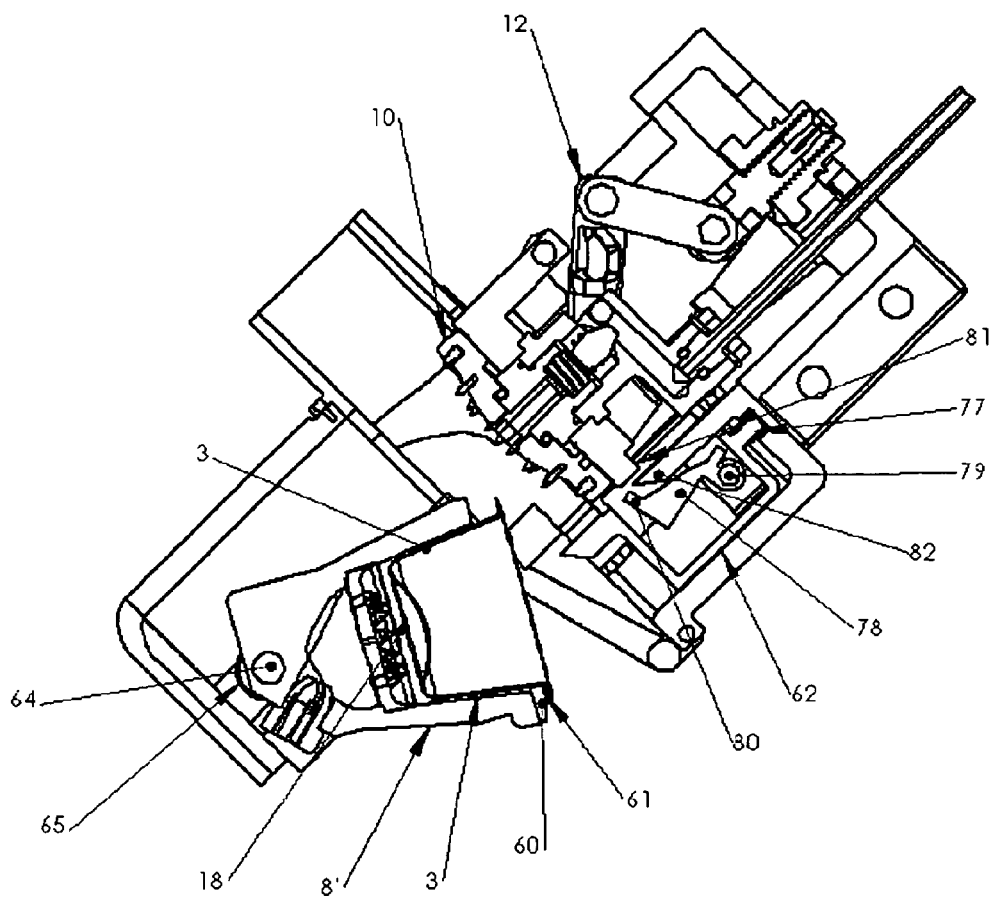
Figure 5G:
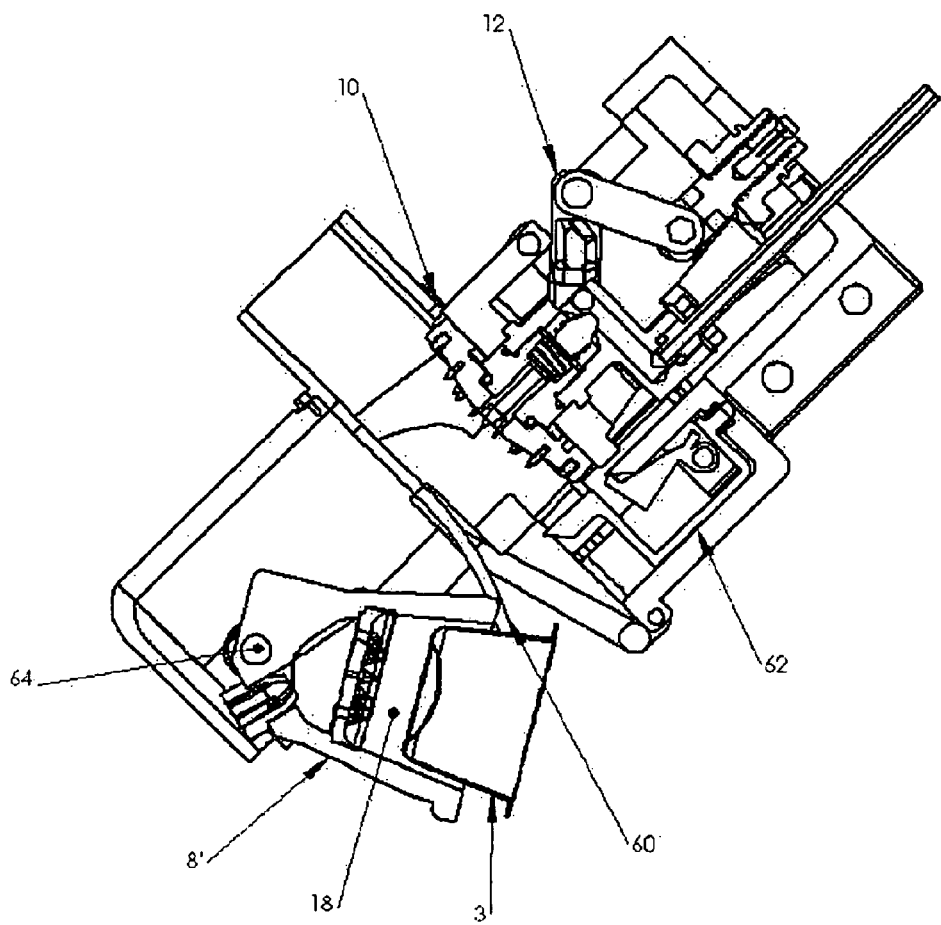
Figure 6A:
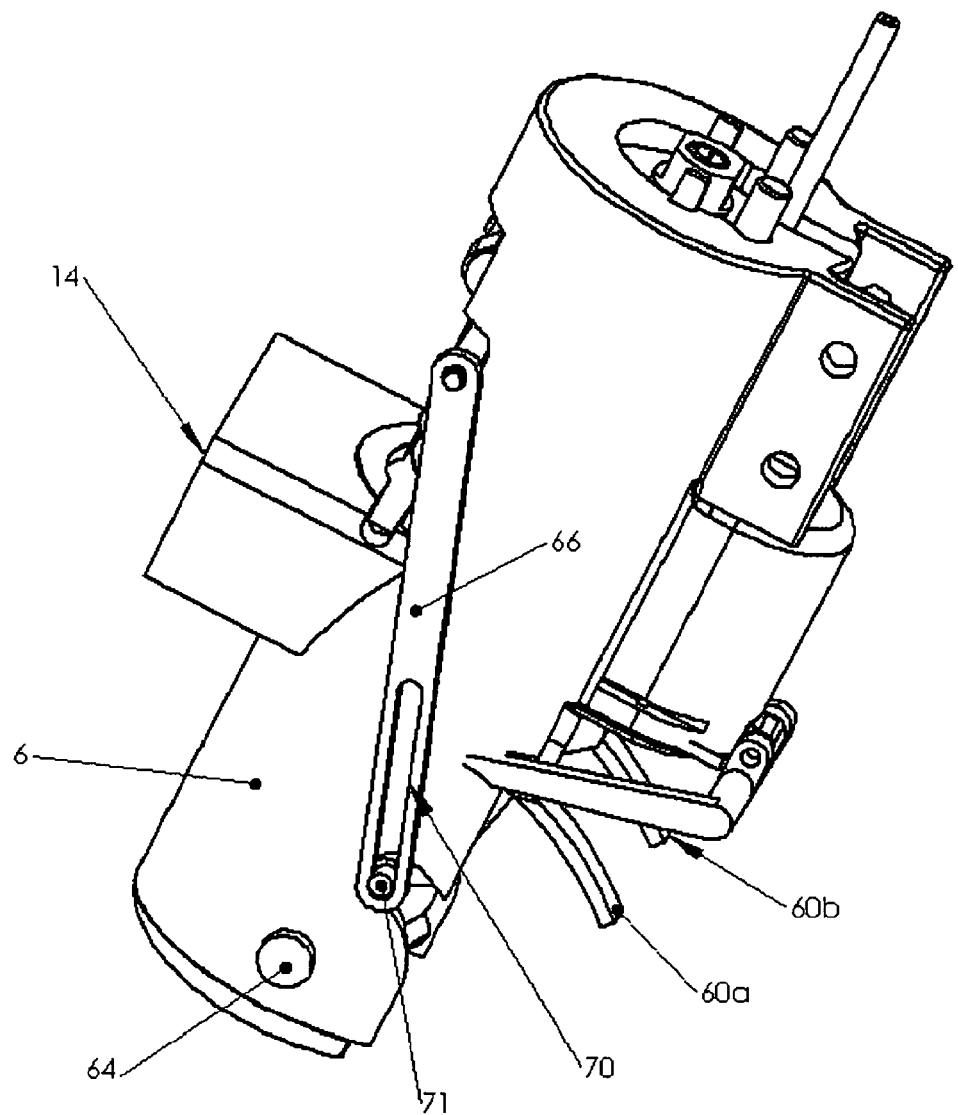
Figure 6B:
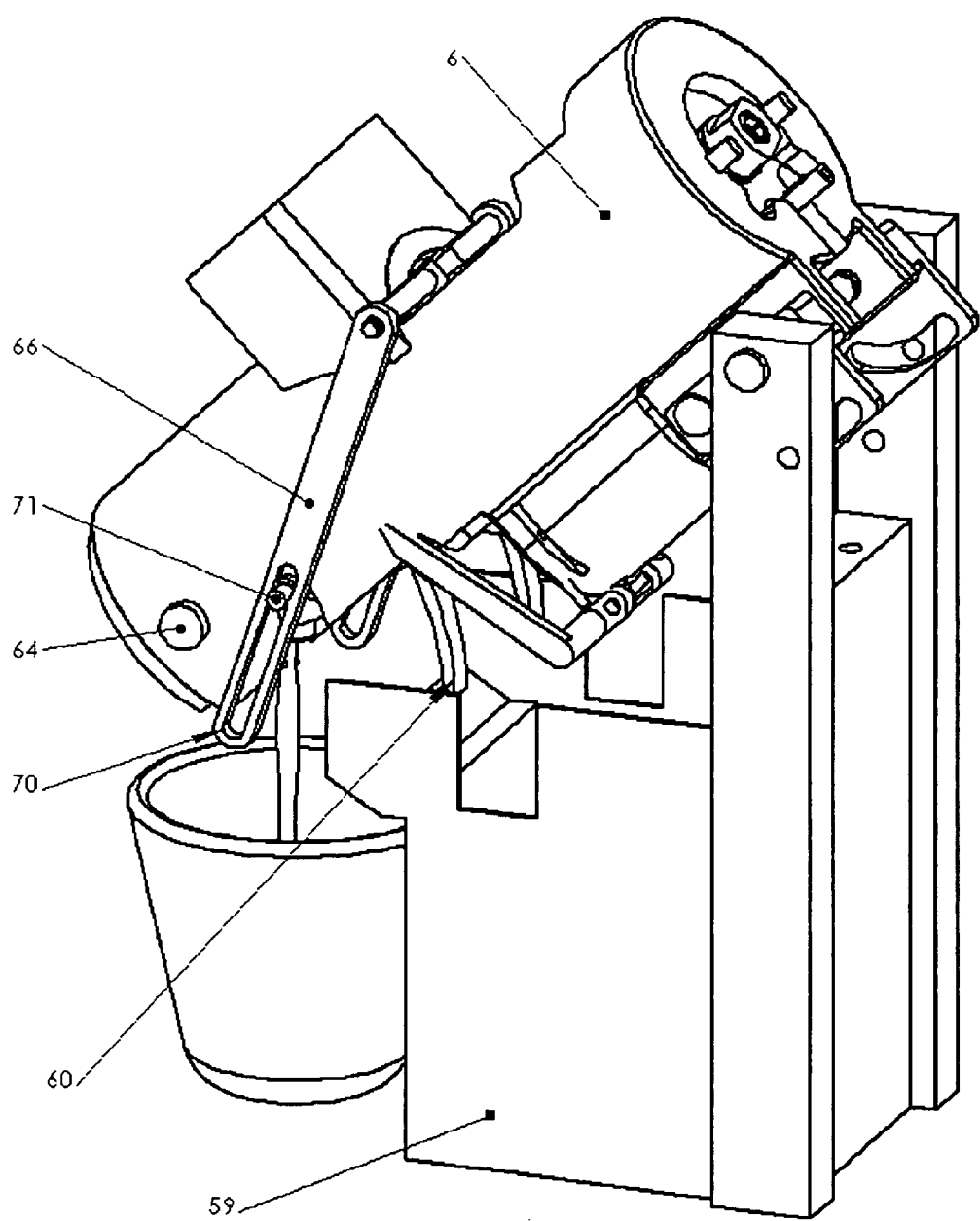
Figure 6C:
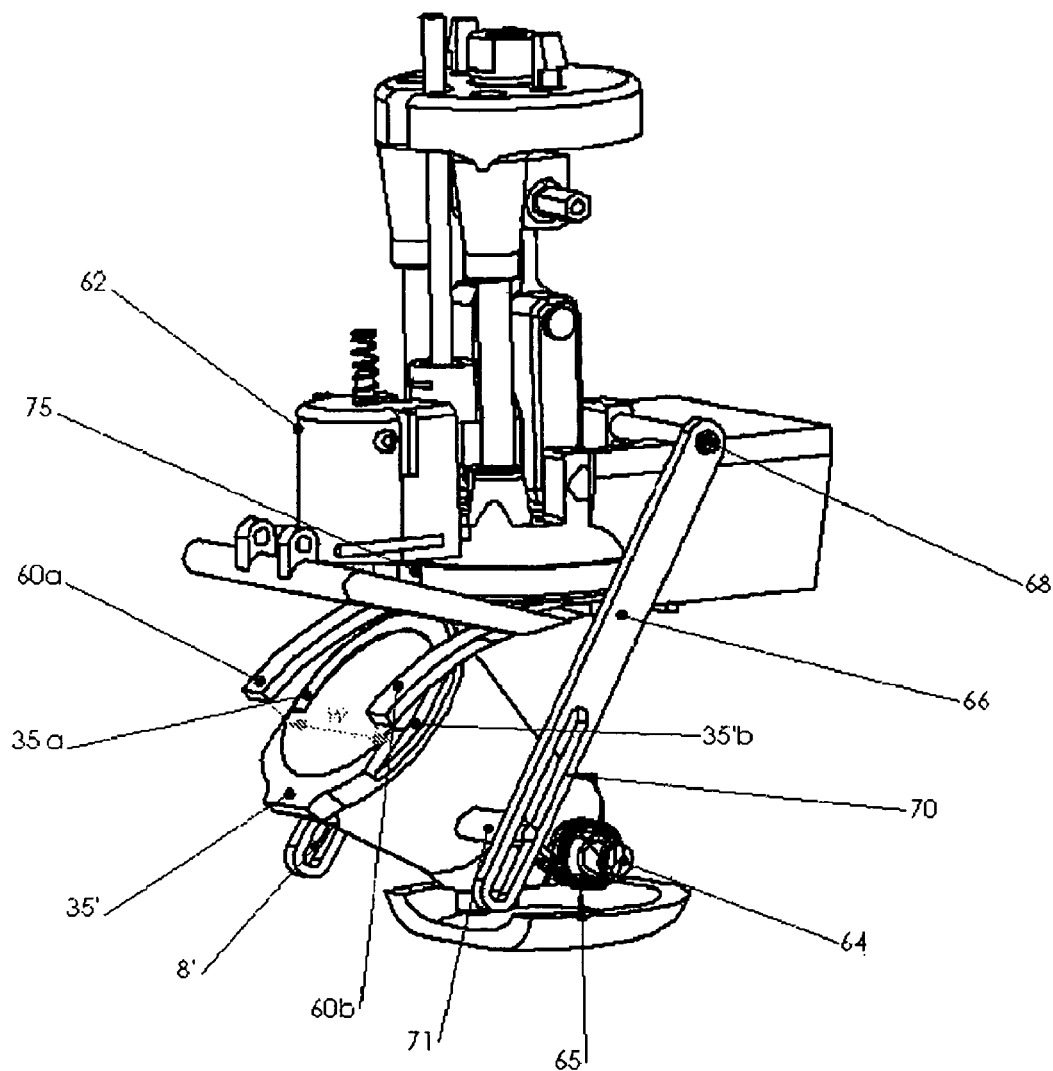

FIGS. 6a-6c are perspective figures of the extraction block of the alternative illustrated in FIGS. 5a-5g, FIG. 6a illustrating the extraction block ready for the introduction of a capsule, FIG. 6b in a position upon injection of water into the capsule and upon extraction of a drink, and FIG. 6c in the position for ejecting the capsule after extraction, portions of the extraction block having been removed for better visibility of the capsule-holder.

Referring to the figures, more particularly to FIGS. 1a, 1b, 2b and 2d, an apparatus for producing a drink from a capsule comprises an extraction block 4 with a body 6, a capsule-holder 8, an injection head 10 and a mechanism 12 for opening the extraction chamber. The extraction block further comprises an introduction channel 14 for inserting a capsule into the apparatus, and an ejection channel or orifice 16 for discharging a capsule after use.

The capsule-holder 8 comprises a housing 18 with a sidewall 20 and an extraction wall 22 forming the bottom of the housing 18. The sidewall 20 of the housing has a truncated flared shape corresponding to the shape of the capsule 3 intended to be received into the housing. The extraction wall may have one or more perforation spikes and one or more orifices for the flow of the liquid product extracted from the capsule after perforation. The extraction wall and the housing of the capsule-holder, as well as the capsule, may advantageously be made as described in patents EP507905 or EP1646304 or may have other configurations. The sidewall of the casing of the capsule has a truncated flared shape, the conicity angle in an embodiment being comprised between 0° and 10°. The bottom wall of the capsule may have an essentially convex, concave or flat shape.

The capsule-holder according to the invention further comprises a mechanism for ejecting the capsule 24 which will be described in more detail below.

Figure 2A:
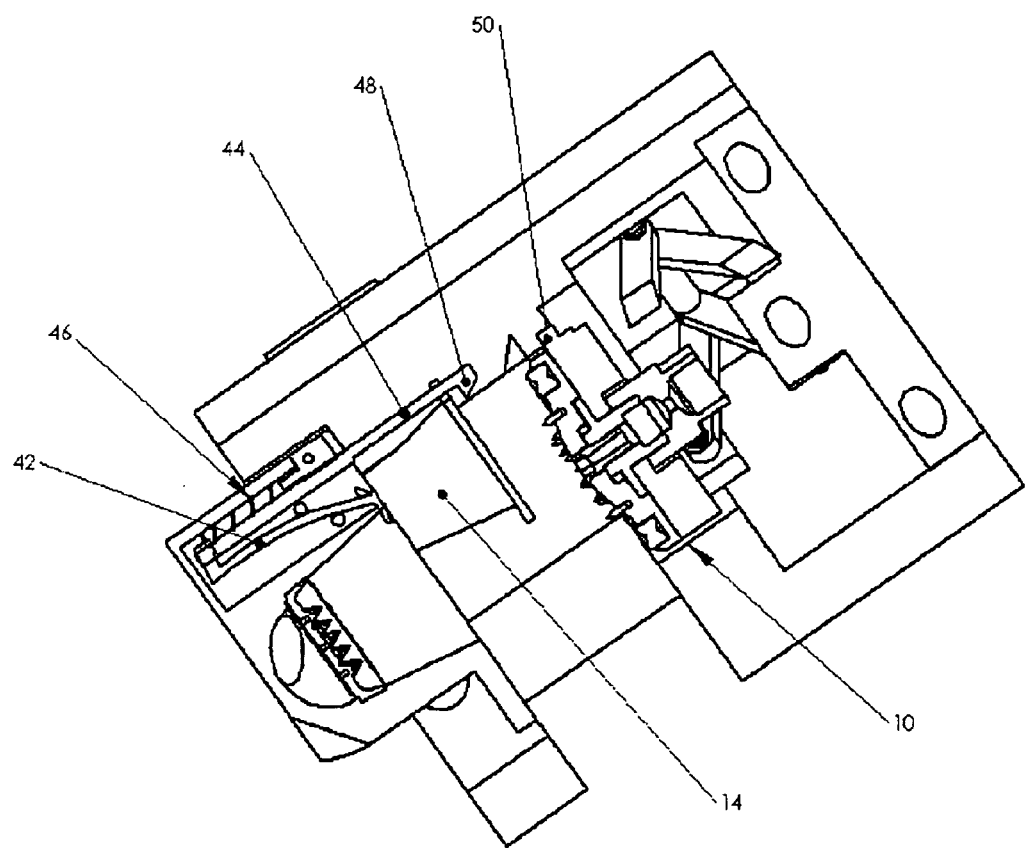
FIG. 2a is another perspective and sectional view of the extraction block according to FIG. 1a, with the injection head in the high (open) position before introducing a capsule.
Figure 2B:
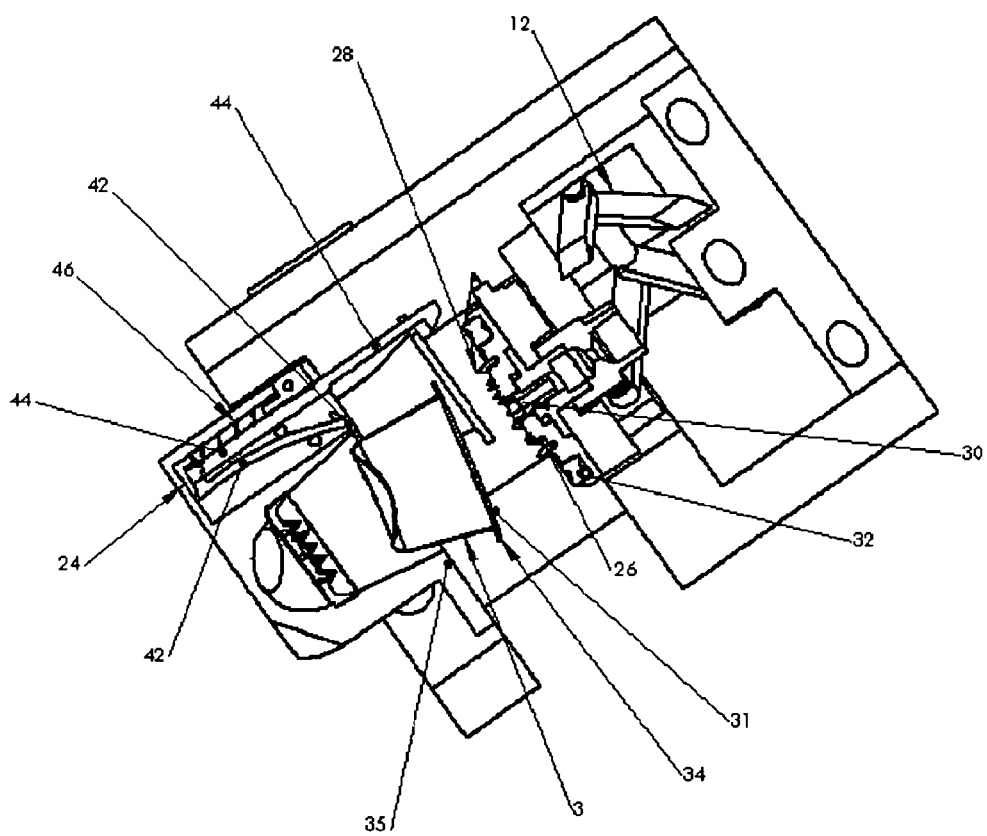
FIG. 2b is a view similar to FIG. 2a, showing the introduction of a capsule falling into a housing of a capsule-holder of the apparatus.
Figure 2C:
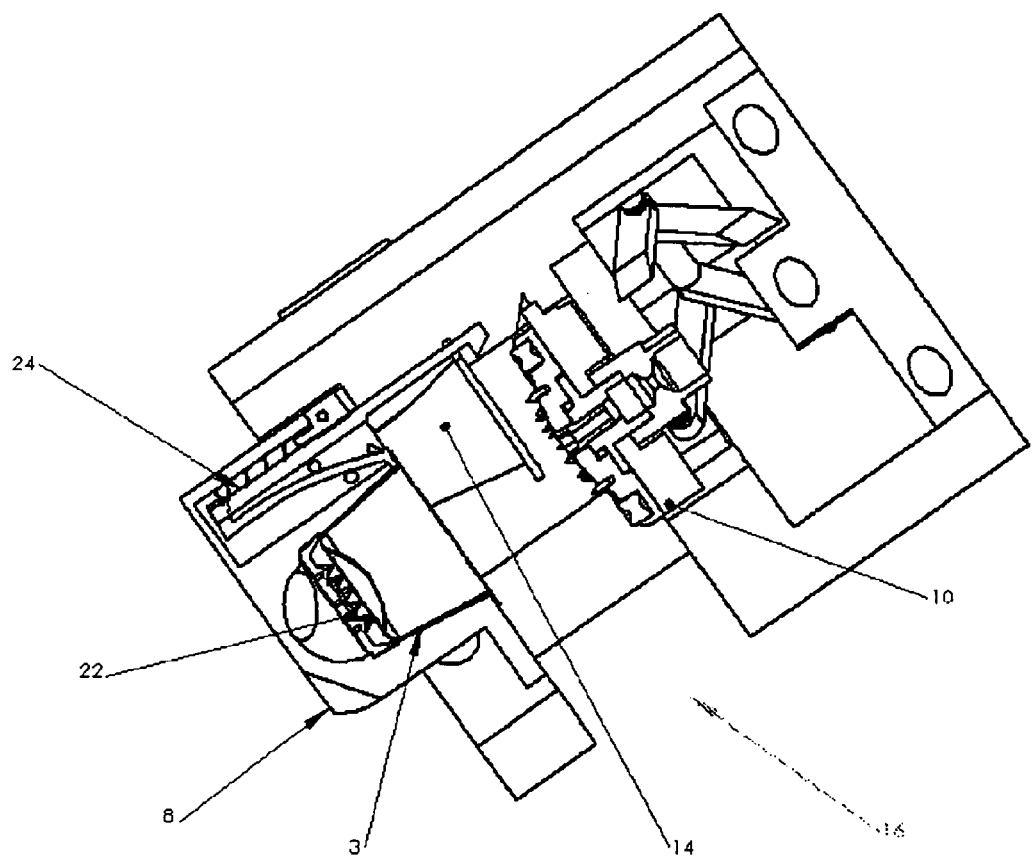
FIG. 2c is a view similar to FIG. 2a, showing the capsule in the housing of the capsule-holder of the apparatus.
Figure 2D:
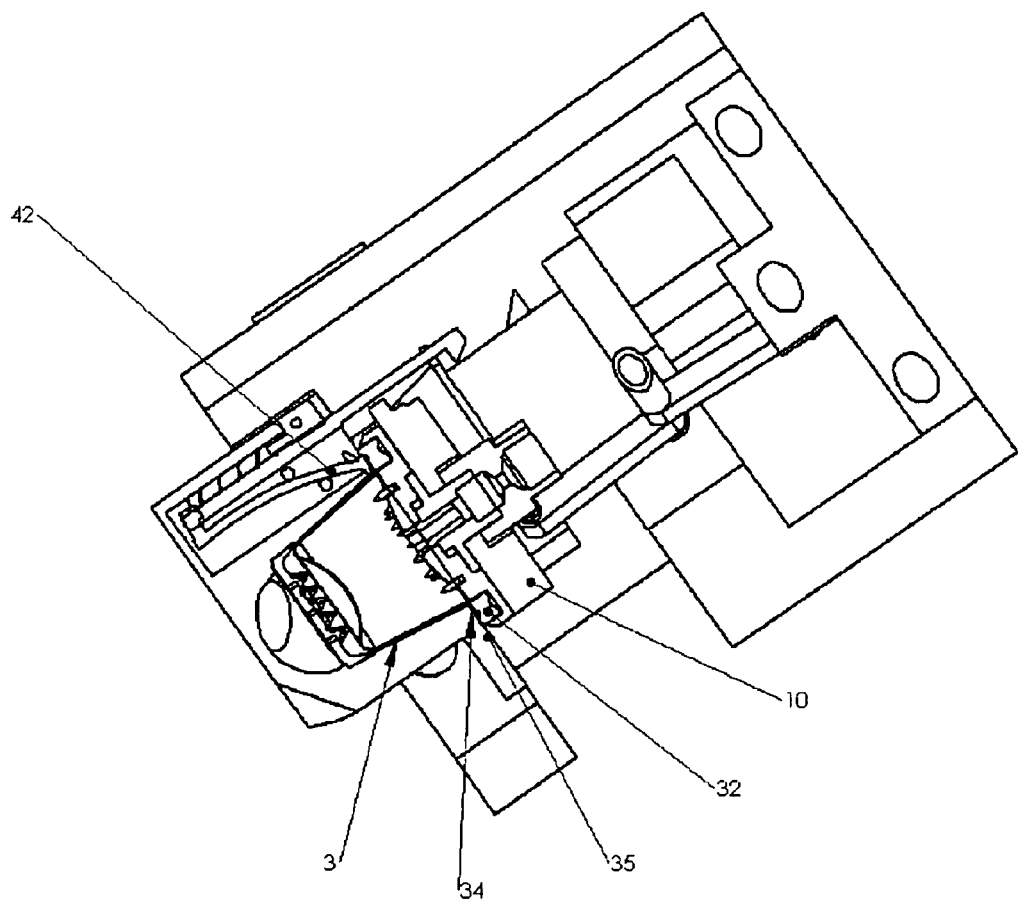
FIG. 2d is a figure similar to FIG. 2a with a capsule in the housing of the capsule-holder and the injection head in the low (closed) position ready for introducing pressurized water.

The injection head 10 comprises an injection wall 26 with perforation spikes 28 and a channel for feeding pressurized water 30 for the injection of water through the upper wall 32 of the capsule when the injection head is closed against the capsule-holder 8, as illustrated in FIG. 2d. The injection wall may advantageously have the design as described in patent EP1646304 or may have other configurations.

The injection head is removable between an open position allowing the introduction of the capsule into the housing 18 of the capsule-holder 8, as illustrated in FIG. 2a and a closed position where the injection head is flattened against the capsule-holder as illustrated in FIG. 2d. A gasket 32 surrounding the injection wall provides a hermetic seal of the injection head against the flange 34 of the capsule which is flattened on the other side against the rim 35 of the capsule-holder.

The displacement of the injection head is actuated by the opening and closing mechanism 12, this mechanism comprising at least two jointed arms or pairs of arms 36a, 36b. An arm or pair of arms 36a is pivotally attached 38a on the body 6 of the extraction block and another arm or pair of arms 36b is pivotally attached 38b on the injection head, both arms (or both pairs of arms) being jointed relatively to each other around a joint axis 38c. The axis of rotation 38 of the first jointed arm 36a is integral with a lever 40 which in the illustrated embodiment is intended to be manually controlled by a user for rotating the first jointed arm 36a.

The first jointed arm (or pairs of arms) 36a may advantageously be shorter than the second jointed arm (or pairs of arms) 36b in order to reduce the size of the extraction block, notably the volume required for the displacements of the jointed arms. The torque required for displacing the injection head in the high position is low. On the other hand, for hermetically sealing the injection head against the flange of the capsule and the rim of the capsule-holder, taking into account the pressures exerted upon injection of pressurized water, the bearing force should be large. The jointed arms allow a large displacement with a low torque at the beginning of the closing movement and a small displacement with a high force for the closing. Locking in the closed position is ensured when the jointed arms 36a, 36b are aligned or have slightly passed beyond the alignment point, as illustrated in FIG. 2d.

The mechanism for ejecting the capsule 24 comprises an ejection pusher 42 coupled with a tie rod 44, and a return spring 46.

Figure 2E:
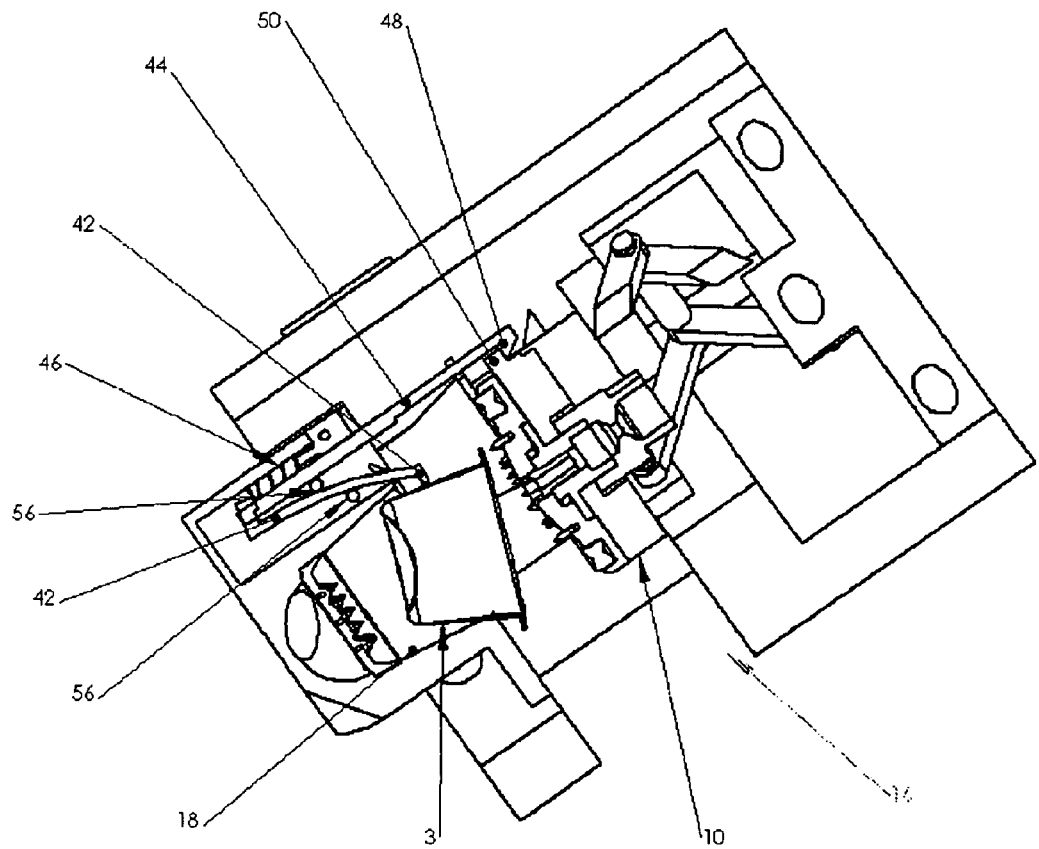
FIG. 2e is a figure similar to FIG. 2a showing the injection head being moved up again and the capsule being ejected after use.
Figure 2F:
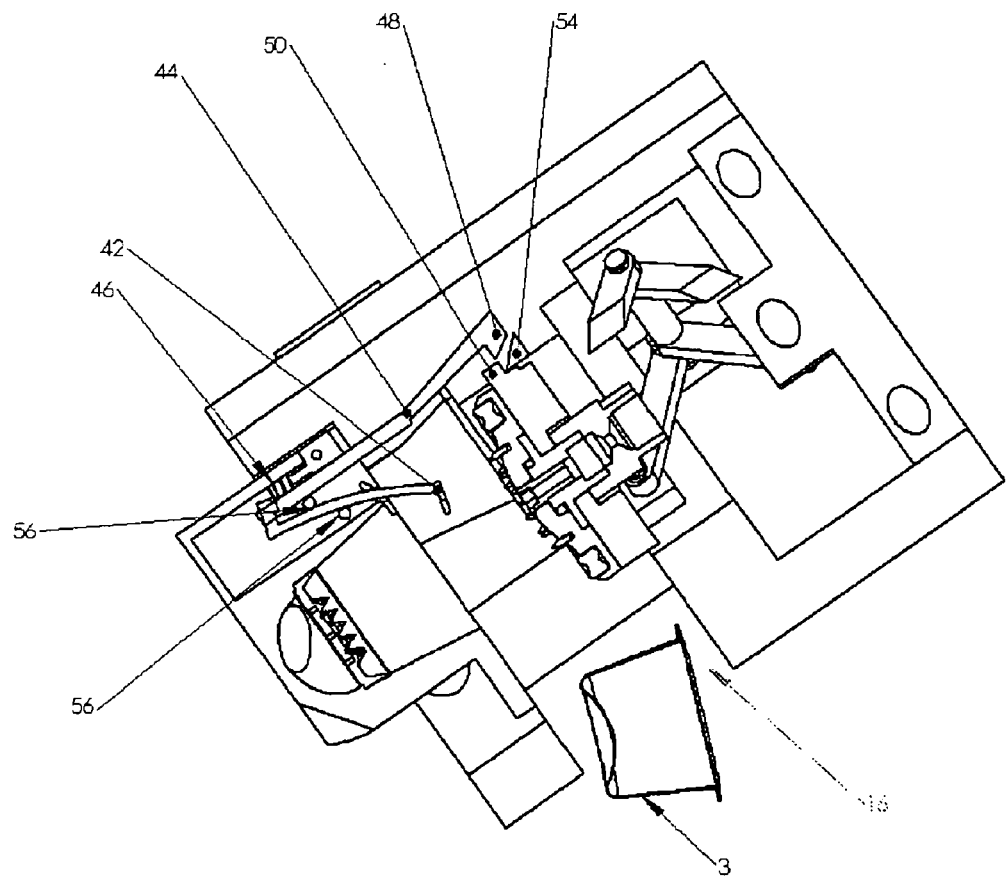
FIG. 2f is a figure similar to FIG. 2e showing the injection head almost entirely moved up again and the capsule being discharged after use.
Figure 3:
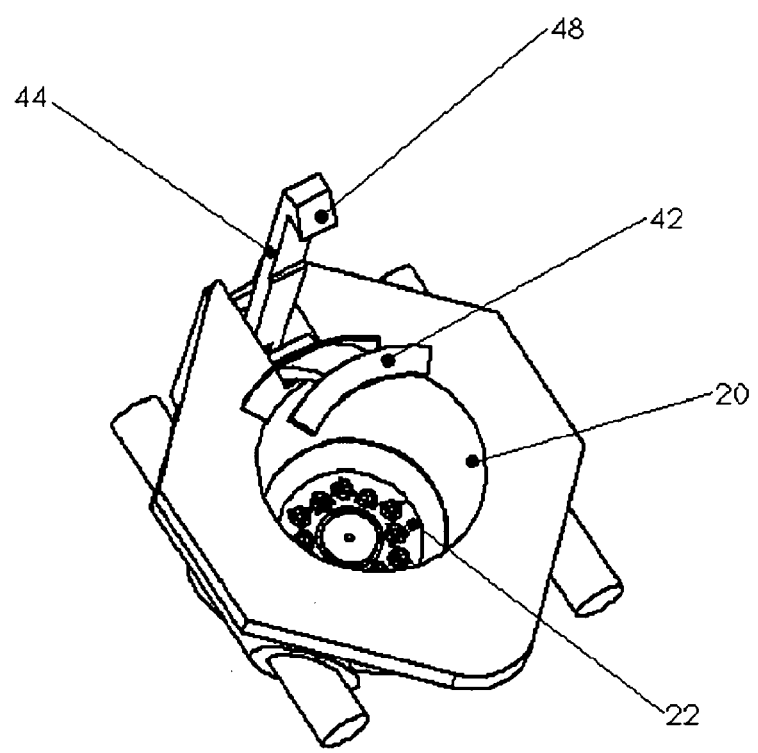
FIG. 3 is a perspective view of the capsule-holder and of the mechanism for ejecting the capsule.

The return spring maintains the pusher 42 in a setback position (low position) as illustrated in FIG. 2a. The tie rod 44 comprises a hook 48 intended to engage with a complementary hook or shoulder 50 on the injection head 10 when the latter is moved upwards again towards its high position as illustrated in FIG. 2e. When the tie rod is moved up again by the injection head upon opening, the pusher 42 is moved upwards again out of its setback position and lifts the flange 52 of the capsule in order to eject it from the housing 18 and to discharge it through the discharge orifice 16. The hook 48 of the tie rod is released from the shoulder or from the complementary hook 50 of the injection head by a cam 54, integral with or attached to the body 6, when the injection head reaches or is close to its high position (i.e. the most open position) as illustrated in FIG. 2f.

The tie rod is thus released and pushed back by the spring 46 into its setback position, as illustrated in FIG. 2a, ready for the introduction of a new capsule in the housing of the capsule-holder.

Figure 4:
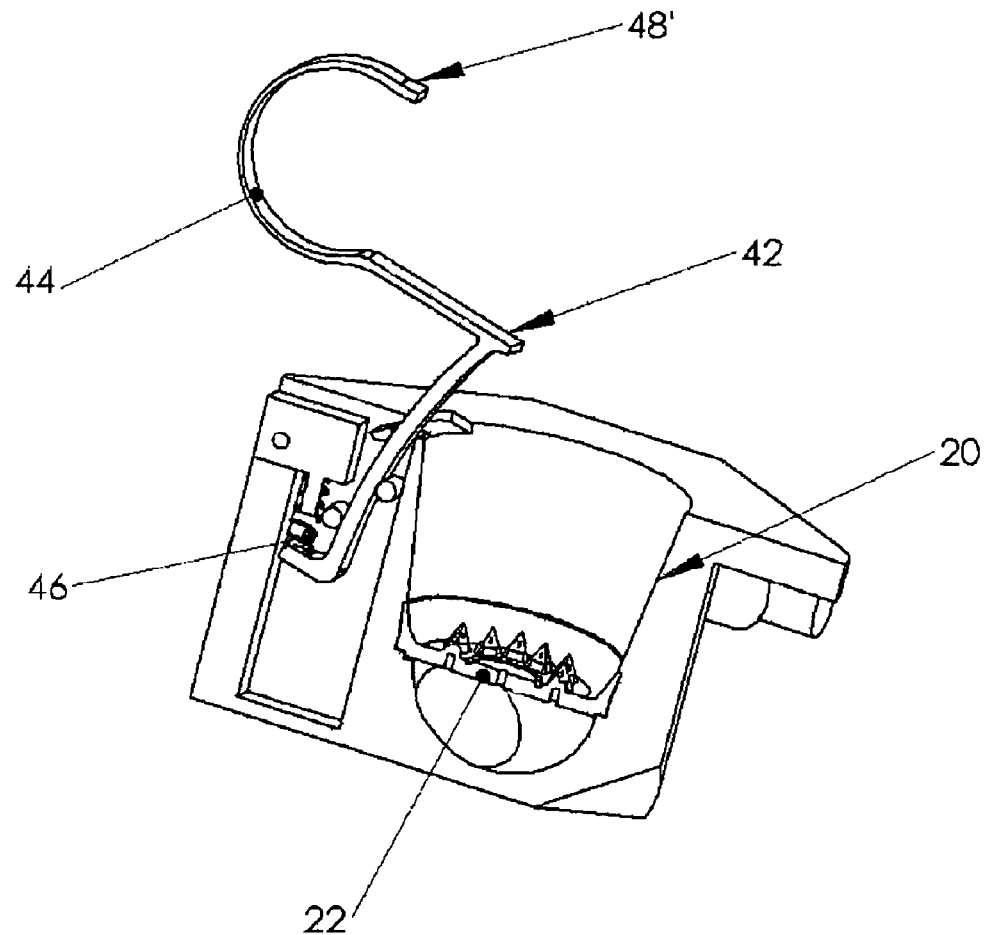
FIG. 4 is a perspective and sectional view of the capsule-holder with an ejection mechanism according to a second alternative.

In the alternative according to FIG. 4, the pusher is pushed back by a return spring 46. However, the tie rod portion comprises a loop, the free end 48' of which acts as a hook for engaging with the shoulder 50 of the injection head, the loop having some elasticity allowing it to be unhooked from the injection head when the latter reaches its high (open) position.

For preparing a drink, the injection head is in its high position as illustrated in FIG. 2a, and the user inserts a capsule into the introduction channel 14. The axis IN of the introduction channel has a tilt angle ($\alpha$) comprised between 30 and 70 degrees, preferably between 40 and 60 degrees, for example about 45 degrees relative to the horizontal plane HZ. The capsule 3 slides by the force of gravity along the introduction channel until it falls into the housing 18 of the capsule-holder 8, as illustrated in FIG. 2b.

In an embodiment, the combination of the tilt angle ($\alpha$) of the channel, of the weight, of the shape of the capsule and of the friction coefficient of the capsule against the channel is configured so as to ensure a peak velocity (V) of the capsule at the instant just before abutting against the sidewall, comprised between $0.5\,\mathrm{ms}^{-1}$ and $3.0\,\mathrm{ms}^{-1}$, preferably between $1.0\,\mathrm{ms}^{-1}$, and $2.0\,\mathrm{ms}^{-1}$. The kinetic energy of the capsule is, by this step, optimized so as to ensure that the capsule falls in to the housing 18 in a reliable way and in the correct position.

In an embodiment, the capsule filled with the substance for preparing a drink, has a weight distribution such that the centre of gravity G is in the lower portion of the capsule, i.e. between the half-height line M and the bottom. This allows the orientation of the capsule to be improved when it falls into the housing 18 in order to ensure that it falls in a reliable way. The centre of gravity may be lowered by varying the thickness and the shape of the casing of the capsule, for example by having addition of material on the bottom wall of the capsule. The bottom of the capsule may be thicker than the sidewalls of the capsule.

The centre of gravity may also be lowered by only partly filling the casing of the capsule with a substance for preparing a drink, to a level of less than 95%, preferably less than 90% of the total volume of the interior of the capsule.

The opening and closing mechanism 12 is then actuated by the rotation of the lever 40 which rotates the first jointed arm 36a, which in turn pivots the second jointed arm 36b, causing the injection head 10 to move down until it bears against the capsule in the housing 18 as illustrated in FIG. 2d. In this closing position, the gasket 32 of the injection head hermetically bears upon the upper face of the flange 34 of the capsule sandwiched against the rim of the capsule-holder, and the spikes 28 of the injection head pierce the upper wall of the capsule.

The pressurized water between 5 and 12 bars is injected through the feeding channel 30 and enters the capsule through the orifices pierced by the spikes 28. When the water pressure inside the capsule reaches a certain value, the bottom of the capsule moves down against the perforation spikes of the extraction wall 22 and the substance to be extracted flows through the orifices of the extraction wall.

After the water injection is finished, the injection head is moved up again by actuating the lever 40. During its upward movement, the injection head engages with the hook 48 of the ejection mechanism which, by being lifted, moves the pusher 42 upwards again which bears upon the flange 34 of the capsule and ejects it from the housing 18. The pusher 42, guided by bearings 56 or slides preferably effects a curvilinear or rectilinear movement but tilted towards the discharge orifice 16 in order to better project the capsule 3 in the direction of the discharge orifice.

The rotation of the jointed arms 36a, 36b may be effected manually as for the illustrated embodiment, but it may also be effected by a motor. The opening and closing mechanism of the injection head may also be built otherwise, for example as a linear actuator with a screw-nut system, or with a hydraulic system.

Figure 1A:
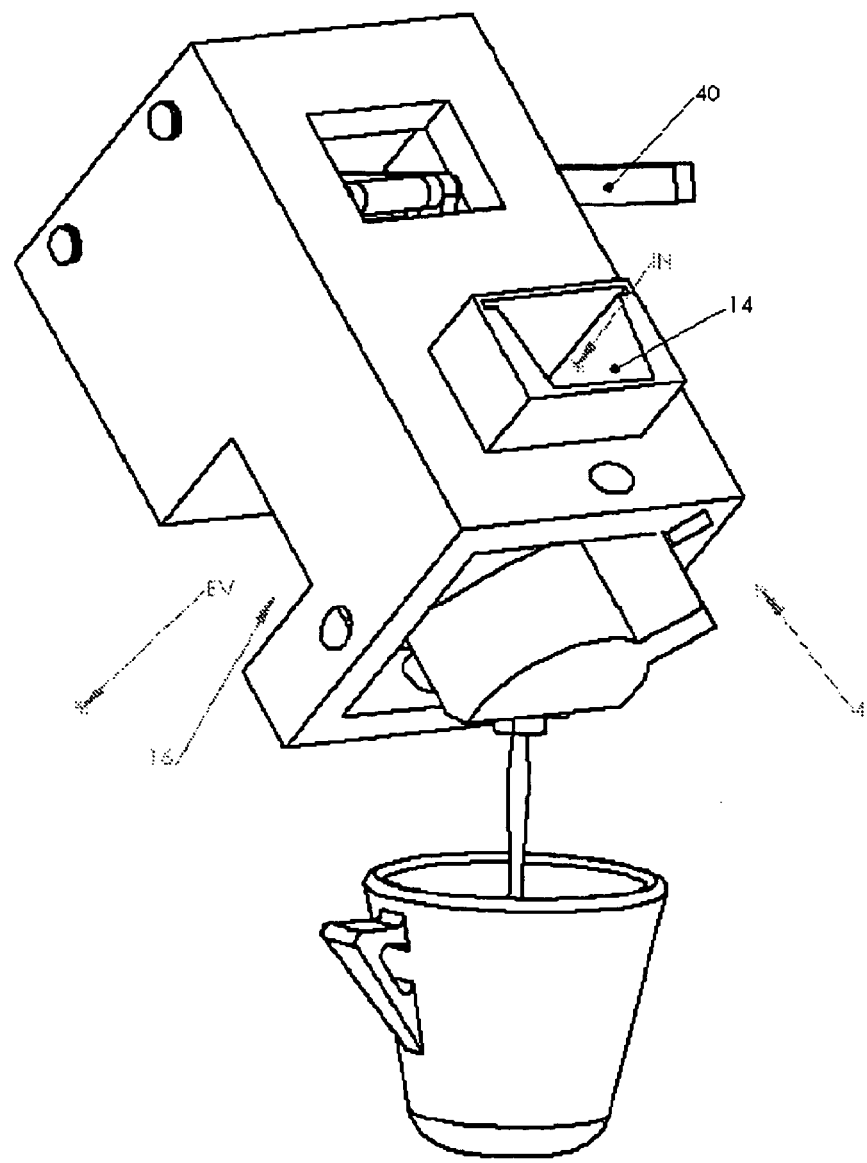
FIG. 1a is a perspective view of an extraction block of an apparatus for producing a drink from a capsule according to the invention.
Figure 1B:
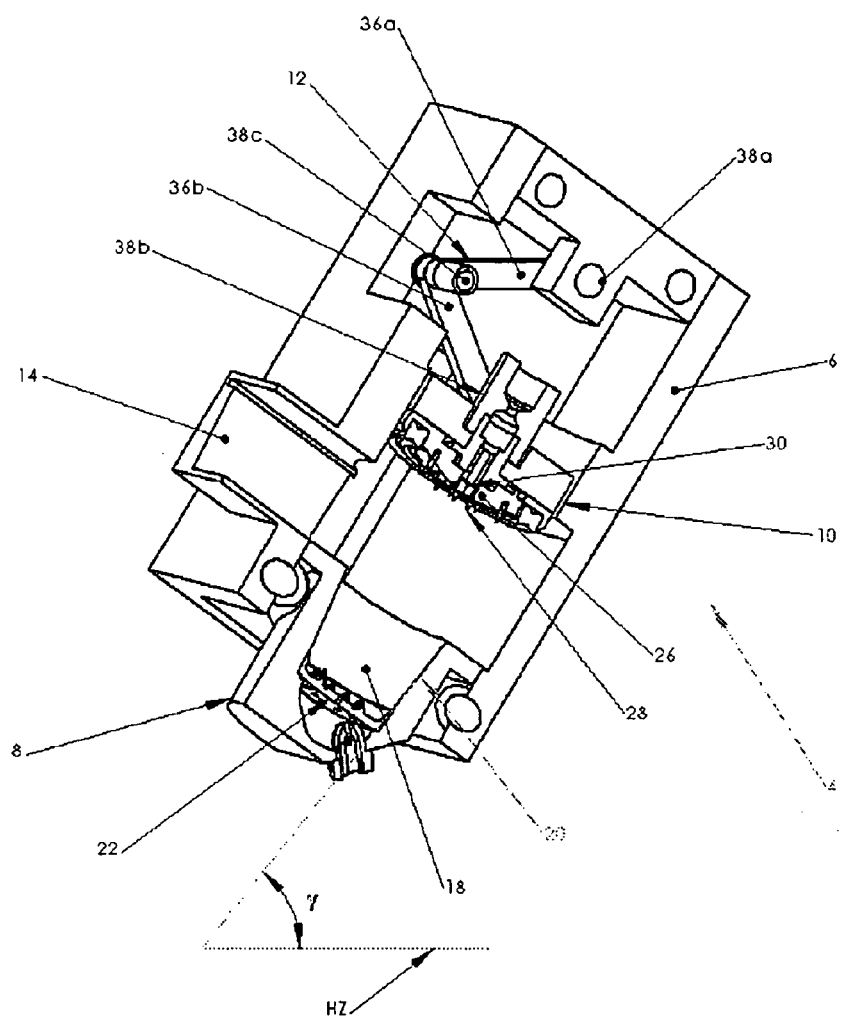
Figure 1C:
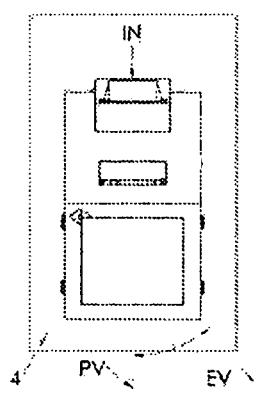
Figure 1D:
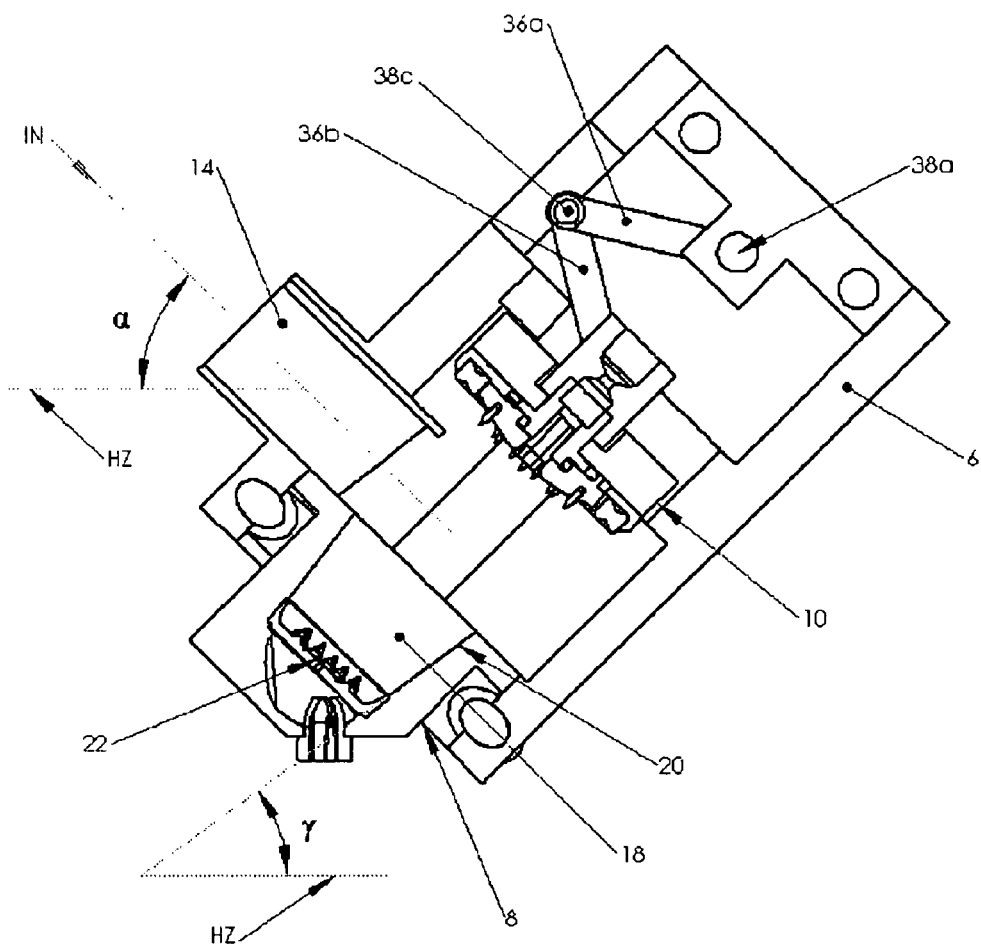

In the first illustrated embodiment, the axis IN of the channel 14 for introducing the capsule is not aligned on a same axis EV as the discharge orifice 16 of the capsule. This allows an abutment to be formed stopping the capsule and causing it to fall into the housing 18 of the capsule-holder towards the end of the downward movement in the introduction channel 14. In the illustrated embodiment, the discharge orifice is directed at an angle $\beta$, preferably between 30 and 50 degrees, for example about 45 degrees from a vertical plane PV passing through the axis IN of the introduction channel (see FIG. 1c). This configuration also allows discharge of the capsules into a basket for collecting used capsules near the extraction block.

Advantageously, the introduction of the capsule into its housing does not require any particular or complicated mechanism, and the ejection of the capsule from its housing is carried out automatically and simply by moving the injection head upwards again. A simple, reliable and ergonomical system for introduction and ejecting the capsules is therefore achieved by the present invention.

Now referring to FIGS. 5a-5g and FIGS. 6a-6c, an extraction block according to another embodiment of the invention is illustrated, in which the mechanism for ejecting and discharging the capsule is different from those described earlier. As regards the elements with the same reference numbers, the reader may refer to the above description relating to them.

In this alternative, the mechanism for discharging the capsule 24' comprises a discharge rail 60 as well as a device 62 for locking the capsule-holder 8'. The capsule-holder 8' is pivotally mounted about an axis of rotation 64 relatively to the body 6 of the extraction block. The discharge rail 60 is integral with the body 6 of the extraction block and preferably comprises two rail portions 60a, 60b, as illustrated in FIG. 6c, positioned on either side of the cavity 18 of the capsule-holder. The rail portions 60a, 60b are separated by a distance w slightly larger than the diameter d of the portion of the capsule below the flange 34. The capsule-holder comprises a rim 35' with recessed portions 35a, 35b which are positioned under the discharge rails when the capsule holder is in the high position (position for introducing the capsule and for extracting it as illustrated in FIGS. 5a, 5b). The portion of the rim 35' of the capsule-holder which is not positioned under the guide rail is at the height of the upper surface of the discharge rail in the extraction position, so that the flange of the capsule may bear against a quasi-continuous rim around the housing 18.

The distance of the upper surface 61 of the discharge rail 60 from the pivot axis 64 of the capsule-holder is larger towards the free end 63 (R1) than the distance of the upper surface of the discharge rail from the pivot axis close to the body of the extraction block (R2). Thus, when the capsule-holder pivots from its extraction position as illustrated in FIG. 5c, to the ejection position as illustrated in FIG. 5g, the rail, by bearing against the underside of the flange of the capsule which slides along the rail, lifts the capsule out of the housing 18. Due to the acceleration of the capsule-holder during its pivoting and rapid movement, the capsule is ejected out of the housing of the capsule-holder with a certain velocity allowing it to be fully freed from the extraction block and to be propelled into a discharge pan 59 (see FIG. 6b) for the capsules, positioned under the extraction block.

The rotation of the capsule-holder from its extraction position to the discharge position is effected by a spring 65, in the illustrated example, a toroidal spring, but many other spring shapes and mechanisms for rotating the capsule may be contemplated within the scope of this invention. The rotation of the capsule may also be driven by an electric motor or actuator.

The return of the capsule-holder from its discharge position to the extraction position is ensured by a return arm 66 (see FIG. 6c) which is pivotally attached to the injection head 10. The return arm 66 is pivotally mounted about an axis 68 attached to a portion integral with the injection head 10, and towards the other end of the arm, there is a slot 70 into which a finger 71 integral with the body of the capsule-holder 8' is inserted. The slot 70 allows a certain displacement of the finger 71 relatively to the return arm 66 when the injection head moves between the low extraction position (as illustrated in FIG. 5c) to the intermediate position between the extraction position and the high position. When the injection head moves up again from this intermediate position to the high position as illustrated in FIG. 5a, the return arm 66 engages with the finger 71 of the capsule-holder and turns it right into its high position (extraction position), as illustrated in FIGS. 5a and 6a.

The device 62 for locking the capsule-holder comprises a removable body 74 with a locking finger 75 bearing against a shoulder 76 of the capsule holder when it is in its extraction position and the removable body is in its locking position, as illustrated in FIG. 5a. The removable body is slidably mounted on the body 6 of the extraction block, a spring 77 positioned between the extraction block and the removable body pushing back the removable body into the locking position as illustrated in FIG. 5a. A hook 78 is pivotally mounted on an axis 79 relatively to the removable body 74, and includes a protrusion 80 intended to engage with a complementary shoulder 81 of the injection head (see FIG. 5c) when it moves down into the extraction position. When the ejection head moves upwards again towards the high position after an extraction cycle, the hook 78 which engages with the ejection head causes the removable body 74 to again move up against the thrust of the spring 77 so that the locking finger 75 is released from the shoulder 76 of the capsule-holder, as illustrated in FIGS. 5d and 5e. This allows the capsule-holder to pivot to the discharge position by the force of the spring 64 (illustrated in FIG. 6c) acting on the capsule-holder. When the injection head 10 moves closer to its high position, the hook 78 abuts against a fixed cam 82 relatively to the extraction block 6, causing rotation of the hook. The hook is released from the injection head in order to allow the removable body 76 to return to its locking position as illustrated in FIG. 5g.

The locking finger 60 may have an oblique surface 85 acting as a cam surface for moving the locking finger upwards again when the capsule-holder is pivoted in order to return to its extraction position. Indeed, the locking finger 75 is already in its low position before the capsule-holder has completely returned to the extraction position and the oblique cam surface 85 allows the removable locking body to move upwards again in order to allow the shoulder 76 to pass under the locking finger which is then pushed back into its locking position engaging with the shoulder 76 of the capsule-holder.

In the illustrated embodiments, the capsule slides by gravity only in the introduction channel 14 down to the housing 18. However, it is also possible to provide a finger or pusher (not shown), for example inside a lid (not shown) pivoting relatively to the extraction block, which pushes the capsule along the introduction channel as far as its position above the housing 18. This lid with a pusher may also act on a position sensor detecting its closed position, indicating that the capsule is introduced and that the injection head may be closed on the capsule-holder. Other means for assisting with conveyance of the capsule along the introduction channel as far as its position above the housing, may be achieved without departing from the scope of the invention. For example, opposite faces of the channel may comprise spring bearings which are elastically moved apart when the capsule is introduced into the introduction channel, and which then push the capsule towards the housing 18 of the capsule-holder upon returning to their rest position.

The invention claimed is:

1. An apparatus and capsule for preparing a drink or a liquid foodstuff, the capsule containing a substance to be extracted by introducing pressurized water into the capsule, the apparatus comprising an extraction block with an introduction channel for introducing the capsule, a capsule-holder with a housing, an extraction wall, a sidewall, an injection head for injecting water into the capsule, and an opening and closing mechanism for effecting a relative movement between the capsule-holder and the injection head for opening and closing the injection head at the capsule-holder, wherein the introduction channel is tilted at an angle ($\alpha$) between 30 and 70 degrees relatively to a horizontal plane (HZ) and in that the angle ($\gamma$) between a portion of the sidewall of the capsule-holder away from the introduction channel and the horizontal plane (HZ) is between 55 and 25 degrees, and wherein the mechanism for opening and closing the injection head comprises at least two jointed arms or pairs of arms, a first arm being pivotally mounted to the body of the extraction block and the other one pivotally mounted to the injection head, the first jointed arm having a shorter length than the second jointed arm.

2. The apparatus and capsule according to claim 1, wherein the introduction channel is tilted at an angle between 40 and 50 degrees relatively to the horizontal plane, and the average angle between the sidewall and the horizontal plane is between 50 and 40 degrees.

3. The apparatus and capsule according to claim 1, wherein the extraction block comprises an orifice for ejecting the capsule oriented at a side angle $\beta$ between 20 and 60 degrees, relatively to a vertical plane (PV) passing through an axis (IN) of the introduction channel.

4. The apparatus and capsule according to claim 3, wherein the side angle $\beta$ is between 30 and 50 degrees.

5. An apparatus and capsule for preparing a drink or a liquid foodstuff, the capsule containing a substance to be extracted by introducing pressurized water into the capsule, the apparatus comprising an extraction block with an introduction channel for introducing the capsule, a capsule-holder with a housing, an extraction wall, a sidewall, an injection head for injecting water into the capsule, and an opening and closing mechanism for effecting a relative movement between the capsule-holder and the injection head for opening and closing the injection head at the capsule-holder, wherein the introduction channel is tilted at an angle ($\alpha$) between 30 and 70 degrees relatively to a horizontal plane (HZ) and in that the angle (α) between a portion of the sidewall of the capsule-holder away from the introduction channel and the horizontal plane (HZ) is between 55 and 25 degrees, wherein the apparatus comprises a mechanism for ejecting the capsule comprising a pusher configured for engaging with the underside of a flange of the capsule when the injection head is moved up again to its open position, and wherein the mechanism for ejecting the capsule comprises a tie rod or tie rod portion integral with the pusher and comprising a hook configured so as to engage with a shoulder or hook of the injection head when it is moved upward again.

6. An apparatus and capsule for preparing a drink or a liquid foodstuff, the capsule containing a substance to be extracted by introducing pressurized water into the capsule, the apparatus comprising an extraction block with an introduction channel for introducing the capsule, a capsule-holder with a housing, an extraction wall, a sidewall, an injection head for injecting water into the capsule, and an opening and closing mechanism for effecting a relative movement between the capsule-holder and the injection head for opening and closing the injection head at the capsule-holder, wherein the introduction channel is tilted at an angle (α) between 30 and 70 degrees relatively to a horizontal plane (HZ) and in that the angle (γ) between a portion of the sidewall of the capsule-holder away from the introduction channel and the horizontal plane (HZ) is between 55 and 25 degrees, wherein the apparatus comprises a mechanism for ejecting the capsule comprising a pusher configured for engaging with the underside of a flange of the capsule when the injection head is moved up again to its open position, and wherein the mechanism for ejecting the capsule comprises a return spring pushing the pusher back into a setback position allowing insertion of a capsule into the housing of the capsule-holder.

7. An apparatus and capsule for preparing a drink or a liquid foodstuff, the capsule containing a substance to be extracted by introducing pressurized water into the capsule, the apparatus comprising an extraction block with an introduction channel for introducing the capsule, a capsule-holder with a housing, an extraction wall, a sidewall, an injection head for injecting water into the capsule, and an opening and closing mechanism for effecting a relative movement between the capsule-holder and the injection head for opening and closing the injection head at the capsule-holder, wherein the introduction channel is tilted at an angle (α) between 30 and 70 degrees relatively to a horizontal plane (HZ) and in that the angle (γ) between a portion of the sidewall of the capsule-holder away from the introduction channel and the horizontal plane (HZ) is between 55 and 25 degrees, wherein the apparatus comprises a mechanism for ejecting the capsule comprising a pusher configured for engaging with the underside of a flange of the capsule when the injection head is moved up again to its open position, and wherein the mechanism for ejecting the capsule comprises a cam engaging with the tie rod when the injection head moves closer to its open position in order to release a tie rod from the injection head.

8. The apparatus and capsule according to claim 1, wherein the capsule-holder is pivotally mounted relatively to the body of the extraction block, the capsule-holder being pivotable from an extraction position to a position for ejecting the capsule, the apparatus further comprising a mechanism for ejecting the capsule comprising a rail configured for supporting a lower rim of the capsule when the capsule-holder is pivoted from its extraction position to its ejection position.

9. The apparatus and capsule according to claim 8, wherein the rail has a shape such that the distance between the rail and the pivoting axis of the capsule-holder increases from the extraction position to the ejection position.

10. The apparatus and capsule according to claim 8, wherein the rail has a curved and smoothed shape.

11. The apparatus and capsule according to claim 1, wherein the capsule has a weight distribution such that its centre of gravity G is in a lower portion of the capsule.

12. The apparatus and capsule according to claim 1, wherein the capsule is only partly filled to a level of less than 90% of the total volume of the interior of the capsule.

13. The apparatus and capsule according to claim 1, 5, 6, or 7 wherein the combination of the tilt angle (α) of the channel, of the weight, an external shape of the capsule and of a friction coefficient of the capsule against the channel is configured in order to ensure a peak velocity of the capsule at the instant just before it abuts against the sidewall of the housing of the capsule-holder, comprised between 0.5 $ms^{-1}$ and 3.0 $ms^{-1}$.

14. The apparatus and capsule according to claim 1, 5, 6 or 7 wherein the combination of the tilt angle (α) of the channel, of the weight, an external shape of the capsule and of a friction coefficient of the capsule against the channel is configured in order to ensure a peak velocity of the capsule at the instant just before it abuts against the sidewall of the housing of the capsule-holder, comprised between 1.0 $ms^{-1}$ and 2.0 $ms^{-1}$.

15. The apparatus and capsule according to claim 5, 6 or 7 wherein the introduction channel is tilted at an angle between 40 and 50 degrees relatively to the horizontal plane, and the average angle between the sidewall and the horizontal plane is between 50 and 40 degrees.

16. The apparatus and capsule according to claim 5, 6, or 7 wherein the extraction block comprises an orifice for ejecting the capsule oriented at a side angle β between 20 and 60 degrees, relatively to a vertical plane (PV) passing through an axis (IN) of the introduction channel.

17. The apparatus and capsule according to claim 16, wherein the side angle β is between 30 and 50 degrees.

* * * * *

UNITED STATES PATENT AND TRADEMARK OFFICE
CERTIFICATE OF CORRECTION

PATENT NO. : 8,875,617 B2
APPLICATION NO. : 12/736139
DATED : November 4, 2014
INVENTOR(S) : Eric Favre Page 1 of 1

It is certified that error appears in the above-identified patent and that said Letters Patent is hereby corrected as shown below:

In the Claims

Claim 5, Column 9, Line 1, replace the word "(α)" with the word "(γ)"

Signed and Sealed this
Fourth Day of July, 2017

Joseph Matal
*Performing the Functions and Duties of the*
*Under Secretary of Commerce for Intellectual Property and*
*Director of the United States Patent and Trademark Office*